US 8,791,958 B2

(12) United States Patent
Bertholon

(10) Patent No.: US 8,791,958 B2
(45) Date of Patent: Jul. 29, 2014

(54) METHOD, APPARATUS, AND PROGRAM FOR DISPLAYING AN OBJECT ON A COMPUTER SCREEN

(75) Inventor: Florent Bertholon, Rueil Malmaison (FR)

(73) Assignee: Dassault Systemes, Velizy Villacoublay (FR)

( * ) Notice: Subject to any disclaimer, the term of this patent is extended or adjusted under 35 U.S.C. 154(b) by 634 days.

(21) Appl. No.: 12/959,700

(22) Filed: Dec. 3, 2010

(65) Prior Publication Data

US 2011/0298822 A1 Dec. 8, 2011

(30) Foreign Application Priority Data

Dec. 17, 2009 (EP) .................................... 09306256

(51) Int. Cl.
*G09G 5/00* (2006.01)
*G06T 15/50* (2011.01)

(52) U.S. Cl.
CPC .................................... *G06T 15/503* (2013.01)
USPC ........................................... 345/629; 382/284

(58) Field of Classification Search
CPC ........................................................ G06T 5/50
USPC .......................................... 345/629; 382/284
See application file for complete search history.

(56) References Cited

U.S. PATENT DOCUMENTS

| | | | | |
|---|---|---|---|---|
| 5,875,265 A | * | 2/1999 | Kasao | 382/229 |
| 6,266,068 B1 | * | 7/2001 | Kang et al. | 345/629 |
| 7,454,087 B1 | * | 11/2008 | Wilensky et al. | 382/284 |
| 7,755,645 B2 | * | 7/2010 | Sun et al. | 345/634 |
| 7,889,205 B1 | * | 2/2011 | Parenteau et al. | 345/545 |
| 8,131,113 B1 | * | 3/2012 | Jin | 382/284 |
| 2001/0043756 A1 | * | 11/2001 | Morita | 382/284 |
| 2003/0002060 A1 | * | 1/2003 | Yokoyama et al. | 358/1.9 |
| 2008/0166069 A1 | * | 7/2008 | Lin | 382/302 |
| 2008/0273110 A1 | * | 11/2008 | Joza et al. | 348/333.05 |
| 2010/0271365 A1 | * | 10/2010 | Smith et al. | 345/419 |
| 2011/0194757 A1 | * | 8/2011 | Lin | 382/162 |
| 2012/0011148 A1 | * | 1/2012 | Rathus et al. | 707/769 |
| 2012/0148115 A1 | * | 6/2012 | Birdwell et al. | 382/116 |
| 2012/0230609 A1 | * | 9/2012 | Fuchs et al. | 382/305 |

OTHER PUBLICATIONS

ACDSee Pro 2.5 User Guidefiles.acdsystems.com/ . . ./acdseepro/manuals/acdseepro25-userguide.pdfSimilar Share View shared post User Guide, 2008.*
"Learning OpenCV" Gary Bradski and Adrian Kaehler, 2008.*
European Search Report for EP 09 30 6256 dated May 17, 2010.
Nawani, G., "Photo Fix: Improving Digital Images with GNU Image Manipulation Program," www.Linux-Magazine.com; 5 pages, retrieved from internet Mar. 31, 2007.

(Continued)

*Primary Examiner* — Javid A Amini
(74) *Attorney, Agent, or Firm* — Hamilton, Brook, Smith and Reynolds, P.C.

(57) ABSTRACT

The invention is directed to a computer-implemented method for displaying an object on a computer screen, the method comprising the steps of: (i) computing a first image; (ii) displaying the first image; (iii) repeating k times the following steps: (iv) computing a $n^{th}$ transition image; (v) computing a $n^{th}$ merged image by merging the first image and the $n^{th}$ transition image, the first image and the $n^{th}$ transition image being weighted; and (vi) displaying the $n^{th}$ merged image; wherein n ranges from 1 to k, n and k being positive integers.

8 Claims, 4 Drawing Sheets

(56) References Cited

OTHER PUBLICATIONS

ACDSEE Pro 2.5, User Guide, "Excerpt from ACDSeepro 2.5 Userguide, sections Editing with Opacity," http://files.acdsystems.com, pp. 1-78, retrieved from internet Jan. 1, 2008.
"Active Slideshow Manual," www.dmxzone.com, 20 pages, retrieved from internet Dec. 31, 2005.
Wu, Y., et al., "Focus+Content Visualization with Animation," Department of Computer Science and Engineering, Hong Kong University of Science and Technology, pp. 1293-1302, Jan. 1, 2006.
Wittenburg, T., "Alpha Blending Graphic Images," Dr. Dobb's Journal, vol. 20, No. 8; pp. 48, 50-52, 54 and 100 dated Aug. 1, 1995.

* cited by examiner

"METHOD, APPARATUS, AND PROGRAM FOR DISPLAYING AN OBJECT ON A COMPUTER SCREEN"

RELATED APPLICATION(S)

This application claims priority under 35 U.S.C. §119 or 365 to European, Application No. 09306256.0, filed Dec. 17, 2009.

The entire teachings of the above application(s) are incorporated herein by reference.

FIELD OF THE INVENTION

The invention relates to the field of computer programs and systems, and more specifically to a method for displaying an object on a computer screen.

BACKGROUND

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systèmes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique. Most of the operations required for manipulating and/or navigating the objects may be performed by the user (e.g. the designers) on the GUI. Especially, the user may create, modify, and delete the objects forming the product, and also explore the product so as to comprehend how objects are interrelated, e.g. via a product structure. Traditionally, these operations are carried out through dedicated menus and icons which are located on the sides of the GUI. Recently, CAD systems such as CATIA allow calling these functions nearby the representation of the product. The designer does not need anymore to move the mouse towards menus and icons. Operations are thus available within reach of the mouse. In addition, the operations behave semantically: for a given operation selected by the designer, the CAD system may suggests to the designer, still nearby the mouse, a set of new operations according to the former selected operation that the designer is likely to select.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). The digital product may be first defined and simulated using an appropriate application. Then, the lean digital manufacturing processes may be defined and modeled.

The PLM solutions provided by Dassault Systemes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way.

Nowadays, as seen above, most of the operations on the modeled objects are graphically performed on CAD systems. Thus, representing the modeled objects plays an important role. The display of a modeled object is the result of a process of computing an image of the modeled object; this process is called rendering. Accordingly, the rendering is the action of creating the image of the modeled object to be displayed, and the image is the result of the rendering. Hence, the terms "computing" and "rendering" an image are synonyms.

Several methods of rendering have been developed and are implemented by CAD systems. Some methods are suitable for photo-realistic rendering, while others are convenient for real-time rendering. Among the photo-realistic renderings, the ray tracing rendering (also referred as ray tracing) is widely implemented by CAD systems. Ray tracing consists in generating an image by tracing the path of the light through pixels in an image plane. In particular, ray tracing allows realistic simulation of lighting over other rendering methods, and effects such as reflections and shadows are a natural result of the ray tracing rendering.

However, ray tracing suffers the drawback that the rendering is not carried out in real time: the method cannot determine a deadline for which the rendering of the image is fully realized. In practice, one considers that a CAD scene is computed in real time if at least 10 images per second may be computed by a CAD system. However, current computer hardware is not always powerful enough to allow computing in real time the full image. Indeed, an image may comprise hundreds of advanced visual effects such as, but not limited to, reflections, shadows, specularity, blow . . . and so on; each advanced visual effect needs computation resources, e.g. computational resources of the CPU and the GPU. As a result, since the resources of the CAD system are limited, a latency period may occur between the start of the computation of the visual effects and the end of their computation. As a result, the display of the image is not instantaneous or real time, which is cumbersome for the designer as there is a lack of interactivity between the CAD system and the designer.

In order to cope with this problem, several techniques had been developed. A classical technique consists in degrading voluntarily the visual rendering during interactions between the displayed modeled object and the designer. Instead of displaying the image of the modeled object with the overall effects, a degraded image is displayed. The degraded image is a basic image which displaying is in progress. Simultaneously, the system checks whether or not the designer still interacts with the displayed modeled object and computes the visual effects. Once a pre-determined time, during which the designer does not interact with the modeled objects, elapsed, a new image comprising the overall effects is then displayed. Incidentally, the pre-determined time may be null, e.g. the new image is displayed as soon as the mouse is released by the user. The classical technique comprises two modes of rendering: the first one is a degraded rendering in which the displayed image does not comprise any visual effect; the second one is a final rendering in which the displayed image comprises all the visual effects.

Nevertheless, the classical technique has several drawbacks. Especially, the transition between the degraded and final images is sudden, which is not ergonomical for the designer and induces a visual discomfort. In addition, the designer does not have any feedback about the progression of the computing of the visual effects. Therefore, the manipulations and navigations performed on the CAD system lack of fluidity: the designer is in situation of waiting. Several techniques have been developed in order to manage the transition between the degraded and final images.

A first method consists in displaying a progress bar. A progress bar is a component in the GUI used to convey the progress of a task, such as a download, a file transfer, or a computation. Thus, the designer can graphically evaluate the remaining time before the computation of the final image ends. However, the display of the final image is still sudden, and its related visual discomfort is not avoided. Moreover, the interactivity between the CAD system and the designer is not improved as the designer has to wait the end of computation of the final image before obtaining a display of the final image.

A second method consists in building, step by step, the final image starting from the degraded image of the modeled object. To this aim, transition images between the degraded image and the final image are successively computed and displayed. A transition image is an image which comprises at least one improved visual effect compared to the former displayed image. The process stops once the last image is the final image, that is, the last image comprises the overall complete effects. Hence, the quality of the degraded image is improved step by step until the computation of the complete visual effects is carried out. As a result, the designer can see the quality increasing until the final image is displayed.

However, despite transition images are displayed, the transition between the degraded and final images is still violent and sudden. Therefore, the designer feels a visual discomfort when viewing the transition between the degraded and final images.

Thus, according to the limitations of the existing solution shortly discussed above, there is a need for an improved method for displaying an object on a computer which enhances the visual comfort of the user.

BRIEF SUMMARY OF THE INVENTION

The invention therefore provides a computer-implemented method for displaying an object on a computer screen. The method comprises the steps of computing (S20) a first image, displaying (S30) the first image, repeating k times the following steps
  computing (S40) a $n^{th}$ transition image;
  computing (S60) a $n^{th}$ merged image by merging the first image and the $n^{th}$ transition image, the first image and the $n^{th}$ transition image being weighted; and
  displaying (S70) the $n^{th}$ merged image; wherein n ranges from 1 to k, n and k being positive integers.

The method according to the invention may comprise one or more of the following features:
  the $n^{th}$ transition image (S40) is computed starting from the $(n-1)^{th}$ transition image;
  the step of computing the $n^{th}$ merged image (60) is carried out by a function $f$ in which the pixels of the first image and $n^{th}$ transition image are variables of the function $f$;
  the first image and the $n^{th}$ transition image are weighted by the function $f$ which is a weighting function;
  the weighting function $f$ is defined as follow:
  $f(\text{Im}_{Deg}, \text{Im}_{Trans}(n), n) = \alpha(n) \cdot \text{Im}_{Trans}(n) + (1-\alpha(n)) \cdot \text{Im}_{Deg}$;
  and wherein $\text{Im}_{Deg}$ is the computed first image, $\text{Im}_{Trans}(n)$ is the computed $n^{th}$ transition image, and $\alpha(n)$ is a function ranging from 0 to 1 and having n as a variable;
  at the step of repeating, k is selected so as to meet an end criterion;
  the end criterion is met when the merged image displayed is a final image;
  k is selected by default or by a user.

The invention further proposes an apparatus for displaying an object on a computer screen, the apparatus comprising means for implementing the steps of the method.

The invention still concerns a computer program, stored on a computer readable medium, for displaying an object on a computer screen, comprising code means for causing a computer to take the steps of the method.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

A system embodying the invention will now be described, by way of non-limiting example, and in reference to the accompanying drawings, where.

DETAILED DESCRIPTION OF THE EMBODIMENTS

The invention is directed to a computer-implemented method for displaying an object on a computer screen. The method according to the invention aims at improving the visual comfort of the user. In particular, one of the goals of the invention is to enhance the transition between low and high quality images of an object.

The initial step of the method of the invention is to compute a first image, which amounts to say that the first image is rendered. Typically, the first image is a degraded image. A degraded image is an image which does not comprise any non real time visual effect. That is, a visual effect that cannot be computed within a time limit which may vary according to the CAD system. The degraded image of an object may therefore be regarded as an image of the object which displaying is in progress. Then, the first image is displayed, e.g. on the GUI of a CAD system. This image is the representation of the object which may be a three-dimensional (3D) modeled object. Next, the following steps are repeated k times: 1) a $n^{th}$ transition image is computed. In practice, the $n^{th}$ transition image is an image which comprises at least one improved visual effect compared to the $(n-1)^{th}$ transition image. 2) An $n^{th}$ merged image is computed by merging the first image and the $n^{th}$ transition image. The first image and the $n^{th}$ transition image are weighted, and therefore, the first and the $n^{th}$ transition images have more or less influence when computing the merged image. 3) Once the merged image have been computed (or rendered), the $n^{th}$ merged image is displayed. These steps 1) 2) and 3) are repeated k times, wherein k is a positive integer. In addition, n is a positive integer which ranges in the interval [1; k].

Figure 1:
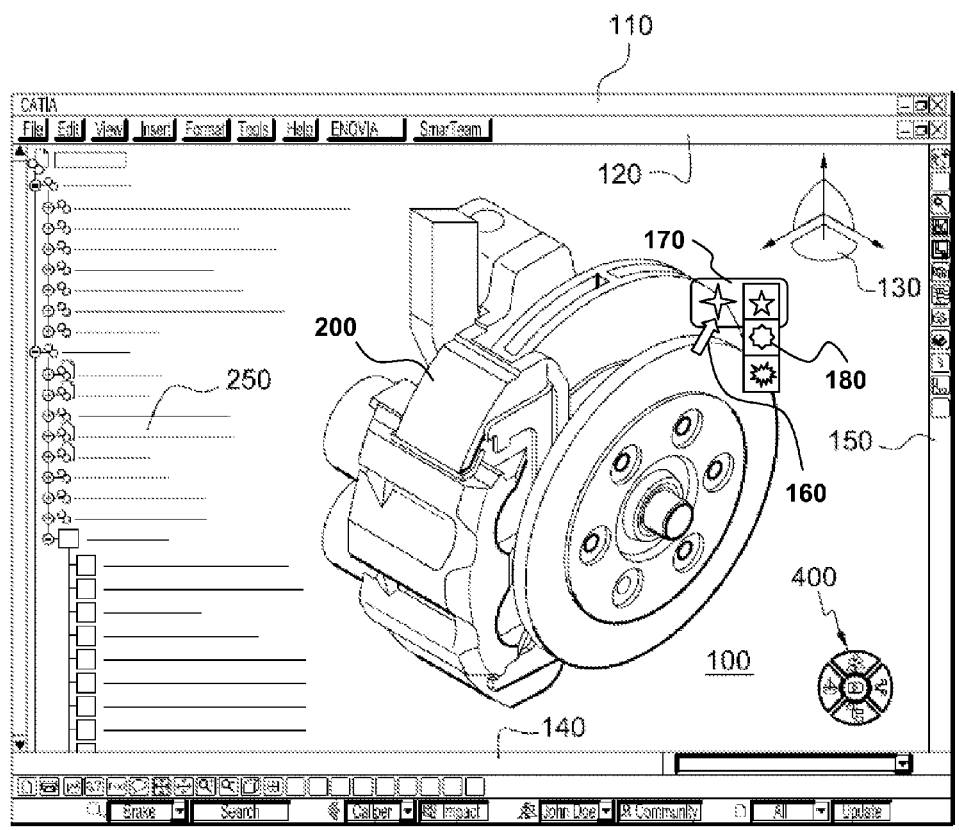
FIG. 1 is a schematic view of typical GUI in a CAD system.

In reference to FIG. 1, the exemplified graphical user interface (or GUI) 100 may be a typical CAD-like interface, having standard menu bars 110, 120, as well as bottom and side toolbars 140, 150. Such menu and toolbars contain a set of user-selectable icons, each icon being associated with one or more operations or functions, as known in the art.

Some of these icons are associated with software tools, adapted for editing and/or working on a modeled product 200 or parts of product 200 such as that displayed in the GUI 100. In the following description, "product", "part", "assembly" and the like may be referred to as "part" for the sake of simplicity. Note that the concept The concept of "part" can in fact be generalized to that of "object", wherein an object can be only a "physical" part of the designed product or, more generally, any software tool participating in the design process (but not necessarily "in" the final product).

The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of a 3D modeled object displayed on the screen.

In addition, the one or more operations or function may be selected directly nearby the modeled product 200 or parts of product 200 displayed in the GUI 100. To this aim, a user-selectable icon 170 associated with operations or functions may appear near a selector 160, e.g. the cursor of a haptic device such a mouse. The user may pass the cursor 160 over the icon 170 which, in response, displays a set of icons 180. Then the user selects one of the icons of the set of icons 180 in order to perform a function associated with said selected icon. Furthermore, the set of icons 180 behave semantically, that is, the set of icons 180 is suggested by the CAD system according to the operation the user is supposed to perform next.

The GUI may for example display data 250 related to the displayed product 200. In the example of FIG. 1, the data 250, displayed as a "feature tree", and their 3D representation 200 pertain to a brake assembly including brake caliper and disc. The GUI may further show various types of graphic tool 130,160, for example for facilitating 3D orientation of the object, for triggering a simulation of an operation of an edited product or render various attributes of the displayed product 200.

Figure 2:
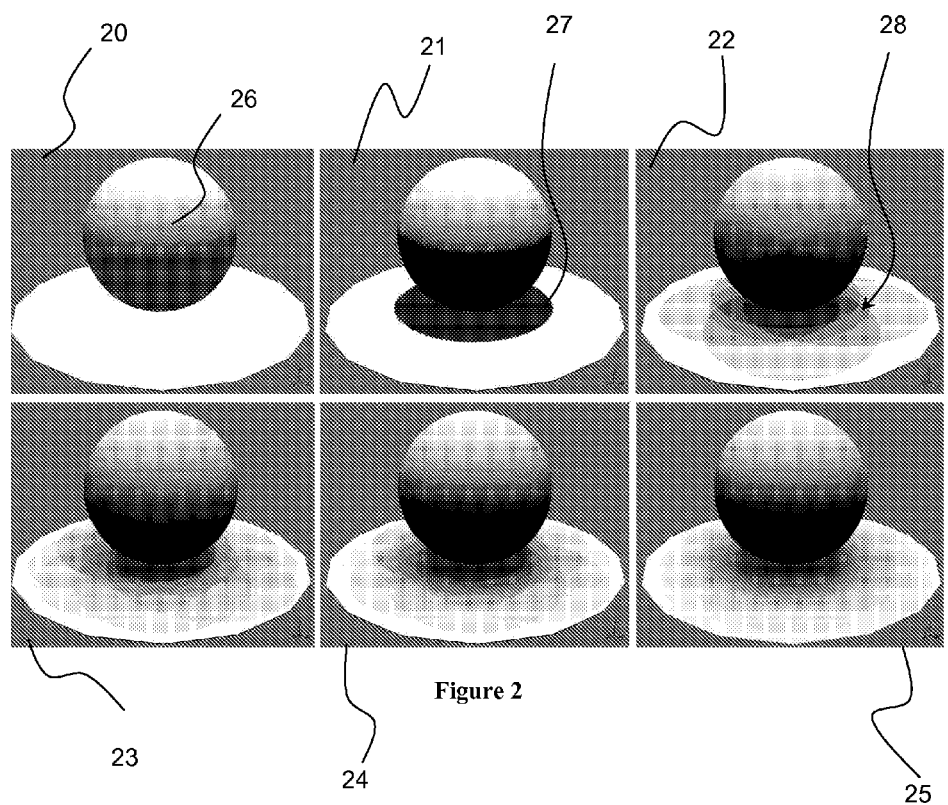
FIG. 2 is an example of a transition of successive images as known in the art.

FIG. 2 depicts a typical example of a transition of successive images, as known in the art. Successive representations 20, 21, 22, 23, 24, and 25 of a sphere 26 are represented within a GUI as described in reference to FIG. 1. The successive representations 21, 22, 23, 24, and 25, display a non real time visual effect (a smooth shadow) which is gradually computed (and thus improved) between each successive representation 21, 22, 23, 24, and 25. In the first image 20, a degraded image of the sphere 26 is displayed. Any visual effect is represented on the degraded image. Then a visual effect (the smooth shadow) is computed in order to be added on the degraded image. To this aim, a first transition image 21 is computed and displayed. This first transition image 21 comprises a first intermediate representation 27 of the visual effect. In other words, the first transition image displays the degraded image 26 on which a partially computed visual effect is added. Next, an improved intermediate representation 28 of the visual effect is computed and displayed on the second transition image 22. The second transition image 22 is the result the first transition image 21 on which the new improved representation 28 of the visual effect have been added. Typically, the new intermediate representation 28 is computed based on the computation result of the first intermediate representation 27 of the visual effect. Similarly, third, fourth and fifth transition images 23, 24, and 25 are successively computed and displayed in the GUI. The fifth transition image 25 is a particular transition image inasmuch as it is the final image. That is, the image 25 is comprised of the degraded image 20 on which the complete visual effect is added: at this step, the computation of the smooth shadow is thus completed.

Figure 3:
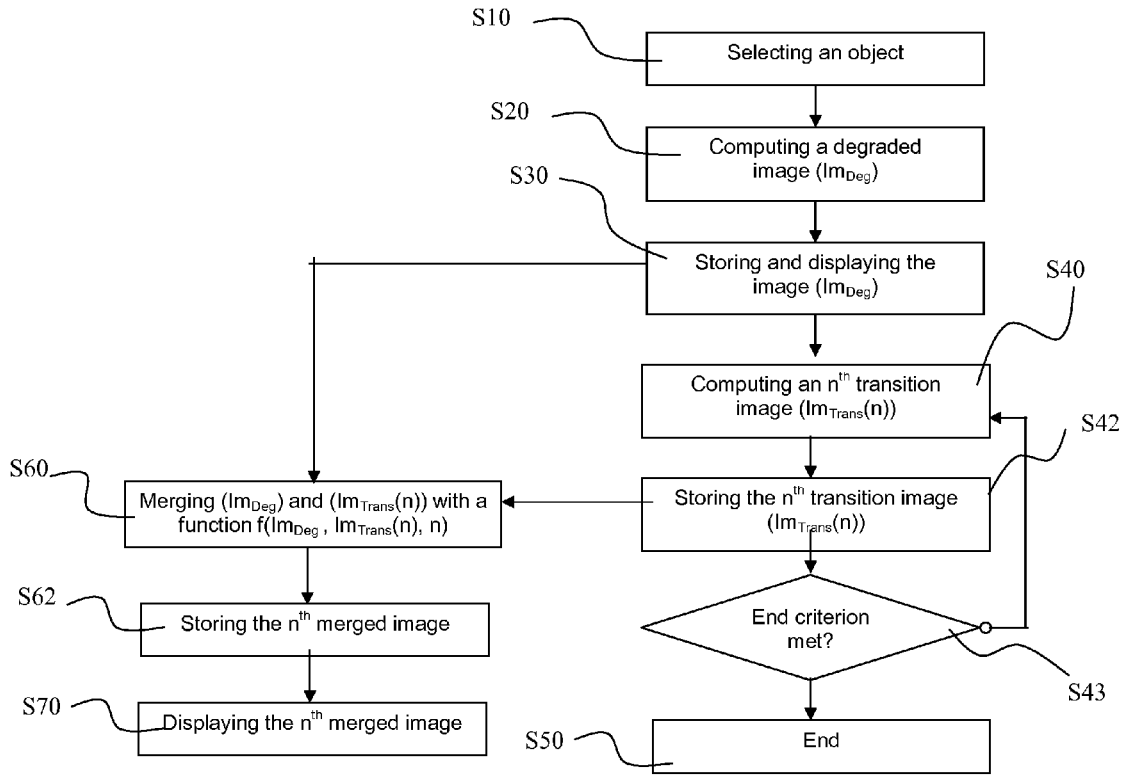
FIG. 3 is a flowchart of a method for displaying an object on a computer screen for carrying out the invention.

FIG. 3 is a flowchart of a method for displaying an object on a computer screen for carrying out the invention.

In practice, an object or an assembly of objects such as a sub-product or a product is selected (S10). The selection of the object may be performed upon user selection, e.g. the user is a designer. The user may carry out the selection via a haptic device such as keyboard, a mouse, a stylus, a touch screen, or the like. For instance, in a two-button mouse, the left button could be used for selecting the object. The system may also identify by default the object, i.e. without requiring user selection.

Typically, the selected object is displayed in a scene, within a GUI as described in reference to FIG. 1. The scene is a space in which spatial relationships between objects are described. In addition, the object may be a modeled object or three-dimensional (3D) modeled objects. A three-dimensional (3D) modeled object is a description of an object in a three dimensional (3D) space. A 3D space is a geometric model of a physical universe, which may be mathematically represented by a geometry which describes every point in three-dimensional space by means of coordinates. Incidentally, other ways of describing three-dimensional space exist. A 3D modeled object refers essentially to specifications, from which geometry is generated. A 3D modeled object is thus a mathematical description depicting of a 3D object, that is, a collection of points in 3D space, connected by various geometric entities such as triangles, lines, curved surfaces, etc. A 3D modeled object is represented by a 3D representation of the 3D modeled object. In general, the 3D representation is displayed in a GUI, and therefore, may be displayed in the scene—which is therefore a 3D scene. An object displayed in 3D allows its viewing from all angles. For instance, the object may be handled and turned around any its axes, or around any axis in the screen. This notably excludes 2D icons, which are not 3D modeled.

Once the object has been selected, a first image of this object is computed (S20), which amounts to say that a first rendering of the object is computed. More generally, the rendering is usually defined as a process of generating (or computing) an image from an object. Typically, the rendering of an object is obtained by computing data representative of this object. As a result, a representation is obtained which may be displayed on a computer screen or on a GUI. Referring back to FIG. 1, the rendering of the modeled product 200 or parts of product 200 is displayed in the GUI 100.

Typically, the first image computed is a degraded image. The degraded image, noted $Im_{Deg}$, is an image which does not comprise any real time visual effect. The degraded image of an object may therefore be regarded as an image of the object which displaying is in progress. The image of an object is often the combination of the degraded image and at least one visual effect.

The visual effects emulate the relationship of the object with its environment. For instance, reflections are incoming and outgoing illumination at a given point of the object. The shadows emulate the areas where direct light from a light source cannot reach due to obstruction by the object. As another example, a bloom visual effect (sometimes referred to as glow) reproduces an imaging artifact of real-world cameras, and produces fringes of light around objects in the image. Visual effects are not limited to the ones above-cited, and hundreds of visual effects may be applied on a degraded image.

One understands that it is advantageous to compute a first image which is a degraded image since the computation of the degraded image requires by far less computation resources: indeed, the visual effects do not need to be computed. As a result, the display time of a first image is reduced.

Then, the first image (e.g. $Im_{Deg}$) is stored and displayed (S30). The storage of the degraded image $Im_{Deg}$ is not mandatory. Indeed, the image $Im_{Deg}$ may be immediately displayed once the computation of the image $Im_{Deg}$ is finished. However, it is advantageous to store the image $Im_{Deg}$. By this way, it is possible to temporize the display of the degraded image, but also to reuse at a latter stage said image $Im_{Deg}$. In this case, resources of the system are preserved since it is not necessary to recomputed the image $Im_{Deg}$.

In operation, the degraded image $Im_{Deg}$ may be stored on a Framebuffer memory which is a video output device that drives a video display from a memory buffer containing a complete image of an object. Framebuffer memory is commonly accessed via a memory mapping directly to the CPU memory space, but there are several methods by which Framebuffer memory may be accessed. The present invention is not limited to any kind of memory, and any suitable memory may be used.

The display of the first image (e.g. $Im_{Deg}$) is performed. To this aim, any method as known in the art may be used. As previously mentioned, it is advantageous to display a first image which is a degraded image as fewer resources are required to compute the image. In addition, the time required to render the image is less important, thus improving the interactivity with the user.

Once the first image (e.g. $Im_{Deg}$) is displayed (S30), a first transition image is computed (S40), and stored (S42). Next, a first merged image is computed (S60), stored (S62), and displayed (S70). Then, a second transition image is computed and stored, and a second merged image is computed, stored, and displayed. The process is iteratively performed: the steps S40, S42, S43, S60, S62, S70 are repeated k times, wherein k is a positive integer. This iterative process may be generalized as follow.

At the step S40, the $n^{th}$ transition image is computed. The $n^{th}$ transition image, noted ($Im_{Trans}(n)$), is an image which comprises an intermediate representation of a visual effect. In other words, $Im_{Trans}(n)$ displays the degraded image on which a partially computed visual effect has been added. The $n^{th}$ transition image is an improved image compared to the $(n-1)^{th}$ transition image: indeed, the computation of the visual effect is performed between the display of the $(n-1)^{th}$ and $n^{th}$ transition images in order to complete the computation of the visual effect.

Preferably, the $n^{th}$ transition image is computed starting from the $(n-1)^{th}$ transition image. The $n^{th}$ transition image ($Im_{Trans}(n)$) is thus an image obtained according to an iterative process, wherein the visual effect of the $n^{th}$ transition image ($Im_{Trans}(n)$) relies on the computation result of the visual effect of the previously computed transition image ($Im_{Trans}(n-1)$).

Each $n^{th}$ transition image is stored (S42), e.g. on a memory. By this way, the computation time of the $n^{th}$ transition image is improved as the partially computed visual effect for the $(n-1)^{th}$ transition image does not need to be computed again. Advantageously, less resources of the system are consumed to compute the $n^{th}$ transition image.

One can notice that the first transition image ($(Im_{Trans}(n=1))$) is a particular image since it is computed starting from the degraded image $Im_{Deg}$. The degraded image $Im_{Deg}$ may also be noted ($Im_{Trans}(n=0)$). Advantageously, and as mentioned previously, the degraded image $Im_{Deg}$ may be stored (S30) after its computation (S20). In consequence, the computation of the first transition image ($(Im_{Trans}(n=1))$) solely requires computing at least one visual effect: therefore, the consumption of resources of the system is decreased.

For each computation of an $n^{th}$ transition image, an $n^{th}$ merged image may be computed (S60) by merging the first image (e.g. $Im_{Deg}$) and the $n^{th}$ transition image, the first image (e.g. $Im_{Deg}$) and the $n^{th}$ transition image being weighted. The merging of the degraded image $Im_{Deg}$ and the $n^{th}$ transition image $Im_{Trans}(n)$ is performed by a merge function noted f whose output is the $n^{th}$ merged image. As a result, the $Im_{Deg}$ and $Im_{Trans}(n)$ are combined and united so that their constituent parts are indistinguishable from one another.

In practice, the $n^{th}$ merged image computed at step S60 is stored (S62), and then displayed (S70) on the computer screen.

Preferably, the pixels of the $Im_{Deg}$ and $Im_{Trans}(n)$ images are variable of the merge function f. Thus, the pixels of the $Im_{Deg}$ and $Im_{Trans}(n)$ images are taken as input, and the merge function f produces an output image, the $n^{th}$ merged image.

The merge function may compute the $n^{th}$ merged image via multiplications, pixel by pixel, of the pixels of $Im_{Deg}$ and $Im_{Trans}(n)$, as well known in the art. Thus, the values of the pixels of the degraded image $Im_{Deg}$ are multiplied by the values of the corresponding pixels in the transition image $Im_{Trans}(n)$. Pixels values may describe how bright a pixel is, and/or what is its colour. Typically, pixels values may be selected following to the RGB (Red, Green, Blue) colour model.

Incidentally, the merge function may also compute the $n^{th}$ merged image via an addition, pixels by pixels, of the pixels of $Im_{Deg}$ and $Im_{Trans}(n)$.

The first image (e.g. $Im_{Deg}$) and the $n^{th}$ transition image are weighted so that both images have a respective weight. Thanks to their respective weight, the degraded image $Im_{Deg}$ and the transition image $Im_{Trans}(n)$ have more or less influence when computing the merged image. The $n^{th}$ merged image is the result of a combination of the degraded $Im_{Deg}$ image and the transition $Im_{Trans}(n)$ image.

In practice, the degraded image $Im_{Deg}$ and the transition image $Im_{Trans}(n)$ are weighted by the function $f$ which is a weighting function. A weighting function is a mathematical function which provides some elements of a set of elements more "weight" (or influence) on the result than other elements in the same set. The weighting function thus amends the relation between the degraded image $Im_{Deg}$ and the transition image $Im_{Trans}(n)$: $Im_{Deg}$ and $Im_{Trans}(n)$ do not contribute equally to the $n^{th}$ merged image. Consequently, the $n^{th}$ merged image may advantageously be computed such that to give prominence to $Im_{Deg}$ or $Im_{Trans}(n)$. Advantageously, this allows to smooth the transition between two successive merged images: the eyes of the user are less disturbed by the appearance of a visual effect. Hence, the method according to the invention allows to smooth the global transition between the degraded image and the final image.

In addition, when a scene is manipulated by the user, the display of the scene may flicker between the degraded rendering and an advanced rendering: the final rendering cannot be displayed before a new manipulation occurs. Thanks to the weight function, first merged images are close to the degraded image so that the user barely sees advanced effects while manipulating the scene: the flickering between the degraded rendering and the final rendering is thus avoided.

In practice, the merge function $f$ may be a weighting function noted: $f(Im_{Deg}, Im_{Trans}(n), n) = \alpha(n) \cdot Im_{Trans}(n) + (1-\alpha(n)) \cdot Im_{Deg}$. $Im_{Deg}$ is the computed first image, and $Im_{Trans}(n)$ is the computed $n^{th}$ transition image. Therefore, the function $f$ takes as input the pixels of the images $Im_{Deg}$ and $Im_{Trans}(n)$ and applies to their respective pixels a function $\alpha(n)$ which is intended to weight the output. The output of the function $f$ is the $n^{th}$ merged image.

Figure 4:
FIG. 4 is a graphical representation of a function usable for carrying out the invention.

Referring now to FIG. 4, a graphical representation of a function $\alpha(n)$ is depicted. $\alpha(n)$ is a function ranging from 0 to 1 and having n as a variable. n is a positive integer which ranges in the interval [1; k], k being a positive integer. For a given value of n, a threshold may be defined. The threshold determines the values of n for which the weighting is performed. While the threshold is not met, the function $\alpha(n<threshold)$ ranges from [0; 1[, and therefore, the function $f$ applies a weight on both the images $Im_{Deg}$ and $Im_{Trans}(n<threshold)$. Once the threshold is met, the function $\alpha(n \geq threshold)$ is equal to the constant 1, and thus, the merged image is equal to the transition image $Im_{Trans}(n \geq threshold)$. The method according to the invention may continue until $k^{th}$ repetition is performed.

As mentioned previously, the steps S40, S42, S43, S60, S62 and S70 are repeated k times, wherein k is a positive integer. The k repetitions of these steps stop once an end criterion is met (S43), and then, the method of the invention stops (S50).

k may be selected so as to meet an end criterion. When the end criterion is met (S43), the value of k is such that k=n. Thus, an $n^{th}$ merged image is computed (S60), stored (S62), and displayed (S70) after that the $n^{th}$ transition image ($Im_{Trans}(n)$) was computed (S40) and stored (S42).

Preferably, the end criterion may be met when the merged image displayed is the final image, that is, the image comprising the overall effects. In this case, the final image is the $n^{th}$ transition image ($Im_{Trans}(n=k)$).

In practice, k is selected by default by the system. Typically, the default value may be selected according to the number of visual effects to compute. Therefore, the method according to the invention stops once the final image is displayed. As a result, the number of computation is optimized and resources of the system are preserved. Furthermore, the default value selected by the system may also be chosen according to its computation resources. For instance, a new system will have more available resources than an old one. Therefore, the new system will require fewer steps in order to compute the final image: therefore, k may be inferior to the number of visual effects of the final image.

Advantageously, the user may select the value k in order to adapt the speed of display of the final image. For instance, on a new system, the final image may be displayed too fast, as explained above. Thus, the user may slow down the display of the final image by increasing the number of transition images until k is equal to the number of visual effects of the final image. As a result, the scene is better understood by the user.

The selection of the value k by the user may be performed before the process begins, but also dynamically during the process. In this latter case, the user may carry out the selection via a haptic device such as keyboard, a mouse, a stylus, or the like. For instance, in a two-button mouse, the left button could be used for dynamically increasing the value k, e.g. by keeping pressed the left button. In response, the time required for displaying the final image is increased.

Figure 5:
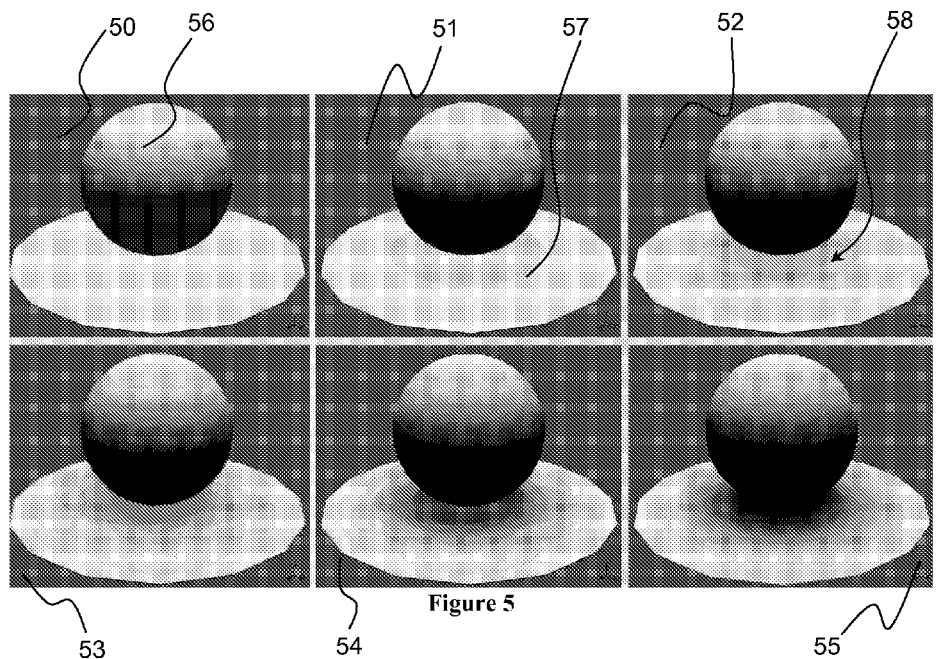
FIG. 5 is an example of a transition of successive images according to the invention.

FIG. 5 shows an example of transition of successive images according to the invention. The first image 50 is a degraded image similar to the image 20 in FIG. 2, and depicts a sphere 56 which is illuminated by a light source located above it (not represented on FIG. 5). Then, successively, transitions images are computed and merged images 51, 52, 53, 54, and 55 are computed thanks to the weighting function $f(Im_{Deg}, Im_{Trans}(n), n) = \alpha(n) \cdot Im_{Trans}(n) + (1-\alpha(n)) \cdot Im_{Deg}$, and displayed in accordance with the present invention. The function $\alpha(n)$ is depicted on FIG. 4. Each merged image 51, 52, 53, 54, and 55 shows the same visual effect (a smoothed shadow) as on images 21, 22, 23, 24, and 25 on FIG. 2. The first merged image 51 comprises a first intermediate representation 57 of the visual effect. The smoothed shadow 57 has been partially computed and added on the degraded image 50 in order to create the first transition image noted $Im_{Trans}(n=1)$. The apparition of the visual effect 57 on image 51 is smoother compared to the apparition of the same visual effect 27 on image 21 of FIG. 2: indeed, the shadow 57 is shaded off compared to the shadow 27. Similarly, a second merged image 52 is displayed. The second merged image comprises a new intermediate representation 58 of the visual effect. This intermediate representation 58 is improved compared to the former representation 57 of the visual effect, and has been computed starting from the computation result of the former representation 57. Again, the display of the image 52 is smoother compared to the display of the image 22 of FIG. 2. Next, third 53 and fourth 54 merged images are displayed. Finally, a fifth merged image 55 is displayed; this image 55 is the final image. At this stage, the end criterion is met and the process ends. The $5^{th}$ merged image (that is, the final image) is the $5^{th}$ transition image ($Im_{Trans}$(n=k=5)) as the threshold of α(n) has been selected such that α(n=5)=1. Consequently, thanks to the method of the invention, the transition is less sudden and violent between two consecutives images. As a result, the visual comfort for the designer is enhanced, while the designer can see the quality increasing until the final image 55 is displayed.

Incidentally, the number of successive images represented in FIG. 5 has been limited for the sake of clarity. In practice, the images 50, 51, 52, 53, 54, and 55 might amount to a respective value of n=0, n=1, n=5, n=9, n=17, and n=128.

It is to be understood that the foregoing method can be applied in any configuration or any system capable to display an object on a computer screen. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language or in assembly or machine language if desired; and in any case, the language may be a compiled or interpreted language.

Figure 6:
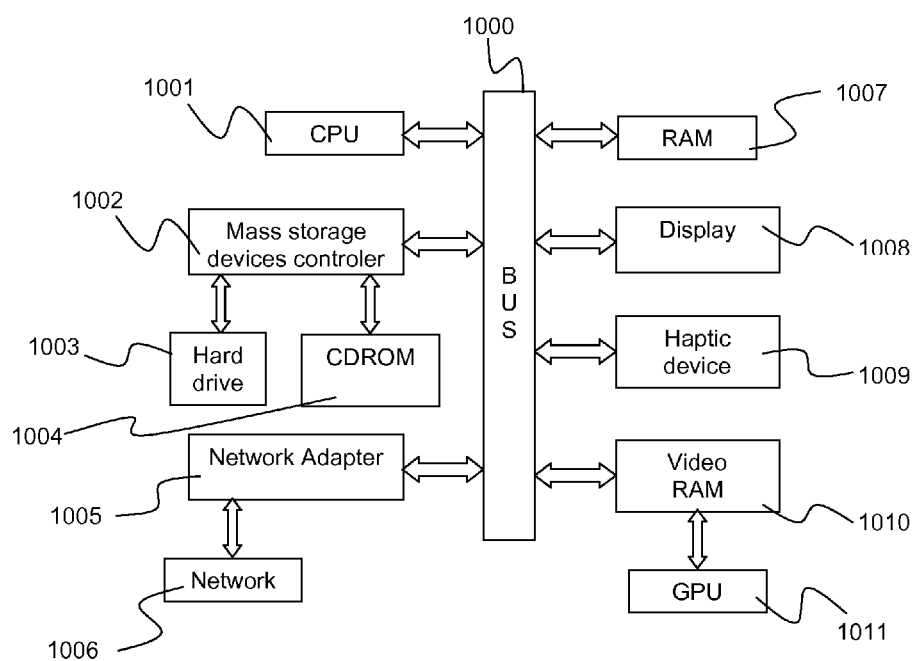
FIG. 6 is a schematic view of a client workstation architecture adapted for carrying out the invention.

FIG. 6 shows a client computer system, e.g. a workstation of a user. The client computer comprises a central processing unit (CPU) 1001 connected to an internal communication BUS 1000, a random access memory (RAM) 1007 also connected to the BUS. The client computer is further provided with a graphical processing unit (GPU) 1011 which is associated with a video random access memory 1010 connected to the BUS. Video RAM 1010 is also known in the art as frame buffer. A mass storage device controller 1002 manages accesses to a mass memory device, such as hard drive 1003. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks 1004. Any of the foregoing may be supplemented by, or incorporated in, specially designed ASICs (application-specific integrated circuits). A network adapter 1005 manages accesses to a network 1006. The client computer may also include a haptic device 1009 such as cursor control device, a keyboard or the like. A cursor control device is used in the client computer to permit the user to selectively position a cursor at any desired location on display 1008. In addition, the cursor control device allows the user to select various commands, and input control signals. The cursor control device includes a number of signal generation devices for input control signals to system. Typically, a cursor control device may be a mouse, the button of the mouse being used to generate the signals.

The preferred embodiment of the present invention has been described. It will be understood that various modifications may be made without departing from the spirit and scope of the invention. Therefore, other implementations are within the scope of the following claims. For instance, any weighting function may be used and it does not require being a linear function. The weighting function may privilege the degraded image for the few first merged images, and then privilege the transition image for the few last merged images.

The invention claimed is:

1. A computer-implemented method for displaying an image of a three dimensional modeled object on a computer screen, the image of the three dimensional modeled object being a combination of a degraded image and at least one visual effect, the method comprising the steps of:
   in response to a user interaction with a display of the image of the three dimensional modeled object, computing the degraded image, the degraded image being the image of the three dimensional modeled object without augmentation by any of the at least one visual effects;
   displaying the degraded image, and determining continuance of the user interaction while displaying the degraded image;
   while the user interaction continues;
      computing a user-implemented visual effect corresponding to the user interaction; and
   repeating k times the following steps:
      computing a $n^{th}$ transition image, wherein the $n^{th}$ transition image comprises one or more representations of the at least one improved visual effect compared to a $(n-1)^{th}$ transition image, and a first transition image comprises one or more representations of the at least one visual effect compared to degraded;
      computing a $n^{th}$ merged image by merging the degraded image and the computed $n^{th}$ transition image, the degraded image and the $n^{th}$ transition image being weighted by a weighting function $f$ defined as:

$$f(Im_{Deg}, Im_{Trans}(n), n) = \alpha(n) \cdot Im_{Trans}(n) + (1-\alpha(n)) \cdot Im_{Deg};$$

$Im_{Deg}$ being the computed degraded image;
   $Im_{Trans}(n)$ being the computed $n^{th}$ transition image; and
   α(n) being a function ranging from 0 to 1 and having n as a variable; and
   displaying the $n^{th}$ merged image;
n ranging from 1 to k, n and k being positive integers, and the $n^{th}$ merged image being the image of the three dimensional modeled object when n=k.

2. The method according to claim 1, wherein the $n^{th}$ transition image is computed starting from the $(n-1)^{th}$ transition image.

3. The method according to claim 1, wherein the step of computing the $n^{th}$ merged image is carried out by a function $f$ in which the pixels of the degraded image and $n^{th}$ transition image are variables of the function $f$.

4. The method according to claim 1, wherein at the step of repeating, k is selected so as to meet an end criterion.

5. The method according to claim 4, wherein the end criterion is met when the merged image displayed is a final image.

6. The method according to claim 4, wherein k is selected by default or by a user.

7. An apparatus for displaying an image of a three dimensional modeled object on a computer screen, the image of the three dimensional modeled object being the combination of a degraded image and at least one visual effect, the apparatus comprising means for:

in response to a user interaction with a display of the image of the three dimensional modeled object, computing the degraded image, the degraded image being the image of the three dimensional modeled object without augmentation by any of the at least one visual effects;

displaying the degraded image, and determining continuance of the user interaction while displaying the degraded image;

while the user interaction continues;

computing a user-implemented visual effect corresponding to the user interaction; and, repeating k times the following steps:

computing a $n^{th}$ transition image, wherein the $n^{th}$ transition image comprises one or more representations of the at least one improved visual effect compared to a $(n-1)^{th}$ transition image, and a first transition image comprises one or more representations of the at least one visual effect compared to the degraded;

computing a $n^{th}$ merged image by merging the degraded image and the computed $n^{th}$ transition image, the degraded image and the $n^{th}$ transition image being weighted by a weighting function $f$ defined as:

$$f(Im_{Deg}, Im_{Trans}(n), n) = \alpha(n) \cdot Im_{Trans}(n) + (1-\alpha(n)) \cdot Im_{Deg};$$

$Im_{Deg}$ being the computed degraded image;

$Im_{Trans}(n)$ being the computed $n^{th}$ transition image; and $\alpha(n)$ being a function ranging from 0 to 1 and having n as a variable; and displaying the $n^{th}$ merged image;

n ranging from 1 to k, n and k being positive integers, and the $n^{th}$ merged image being the image of the three dimensional modeled object when n=k.

8. A computer program product, stored on a non-transitory computer readable medium, for displaying an image of a three dimensional modeled object on a computer screen, the image of the three dimensional modeled object being the combination of a degraded image and at least one visual effect, the computer program product comprising code means for causing a computer to take the steps of:

in response to a user interaction with a display of the image of the three dimensional modeled object, computing the degraded image, the degraded image being the image of the three dimensional modeled object without augmentation by any of the at least one visual effects;

displaying the degraded image, and determining continuance of the user interaction while displaying the degraded image;

while the user interaction continues;

computing a user-implemented visual effect corresponding to the user interaction; and repeating k times the following steps:

computing a $n^{th}$ transition image, wherein the $n^{th}$ transition image comprises one or more representations of the at least one improved visual effect compared to a $(n-1)^{th}$ transition image, and a first transition image comprises one or more representations of the at least one visual effect compared to the degraded;

computing a $n^{th}$ merged image by merging the degraded image and the computed $n^{th}$ transition image, the degraded image and the $n^{th}$ transition image being weighted by a weighting function $f$ defined as:

$$f(Im_{Deg}, Im_{Trans}(n), n) = \alpha(n) \cdot Im_{Trans}(n) + (1-\alpha(n)) \cdot Im_{Deg};$$

$Im_{Deg}$ being the computed degraded image;

$Im_{Trans}(n)$ being the computed $n^{th}$ transition image; and $\alpha(n)$ being a function ranging from 0 to 1 and having n as a variable; and displaying the $n^{th}$ merged image;

n ranging from 1 to k, n and k being positive integers, and the $n^{th}$ merged image being the image of the three dimensional modeled object when n=k.

\* \* \* \* \*